United States Patent [19]

Gerhard

[11] Patent Number: 4,997,326
[45] Date of Patent: Mar. 5, 1991

[54] ARRANGEMENT FOR LOCKING LOADING UNITS

[75] Inventor: Helmut Gerhard, Weitefeld, Fed. Rep. of Germany

[73] Assignee: Westerwaelder Eisenwerk Gerhard GmbH, Fed. Rep. of Germany

[21] Appl. No.: 457,756

[22] PCT Filed: Jun. 6, 1988

[86] PCT No.: PCT/DE88/00336
§ 371 Date: Dec. 19, 1989
§ 102(e) Date: Dec. 19, 1989

[87] PCT Pub. No.: WO88/10202
PCT Pub. Date: Dec. 29, 1988

[30] Foreign Application Priority Data

Jun. 19, 1987 [DE] Fed. Rep. of Germany ....... 8708562

[51] Int. Cl.$^5$ .............................................. B63B 25/28
[52] U.S. Cl. ......................................... 410/79; 410/82
[58] Field of Search ...................... 410/77, 78, 79, 82, 410/85, 155

[56] References Cited

U.S. PATENT DOCUMENTS

| | | | |
|---|---|---|---|
| 3,159,111 | 12/1964 | Gutridge | 410/82 |
| 3,701,562 | 10/1972 | Carr | 410/82 |
| 3,722,714 | 3/1973 | Morris et al. | 410/82 X |
| 4,505,402 | 2/1985 | Gerhard . | |
| 4,648,764 | 3/1987 | Pavlick | 410/77 |
| 4,682,923 | 7/1987 | Gerhard . | |

Primary Examiner—David A. Bucci
Assistant Examiner—Craig Slavin
Attorney, Agent, or Firm—Evenson, Wands, Edwards, Lenahan & McKeown

[57] ABSTRACT

A symmetrical latching plate, which includes a central latching portion having a recess and two lateral hook portions, is used for mutually coupling two back-to-back containers and for simultaneously locking the same to a common twistlock. In the latching position, in which the latching plate extends in parallel to a loading surface accommodating the containers, the twistlock engages in the recess, and the hook portions engage behind web portions respectively provided on either container. In a vertical position, which is pivoted by 90° relative to the latching position, the latching plate can be withdrawn along a bottom framework member of at least one of the containers.

17 Claims, 1 Drawing Sheet

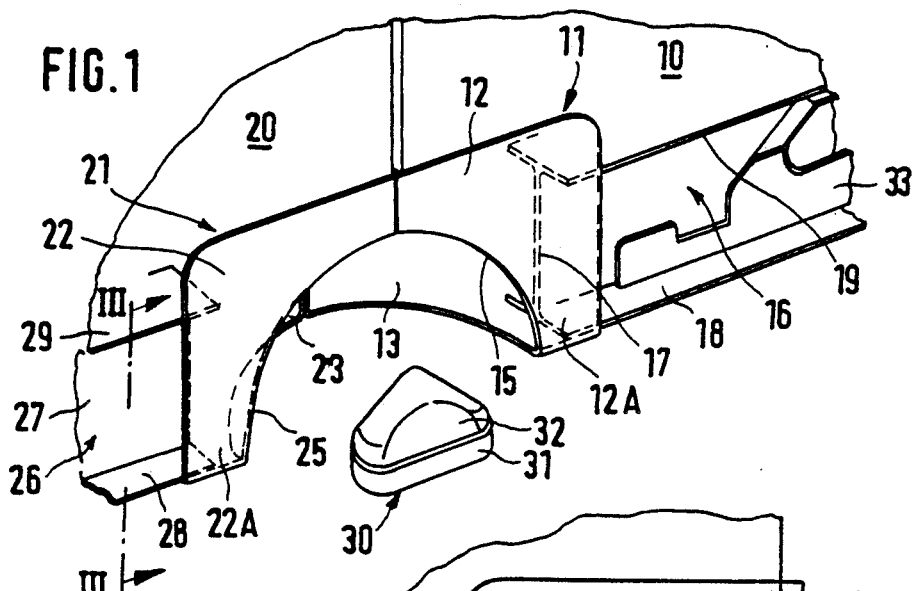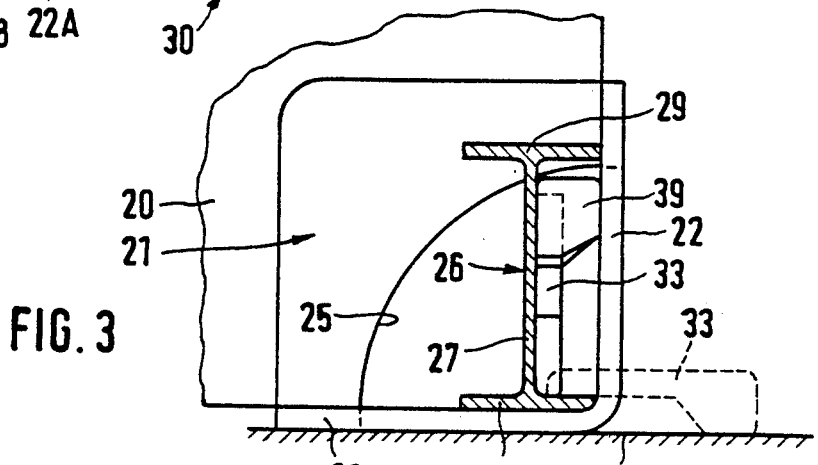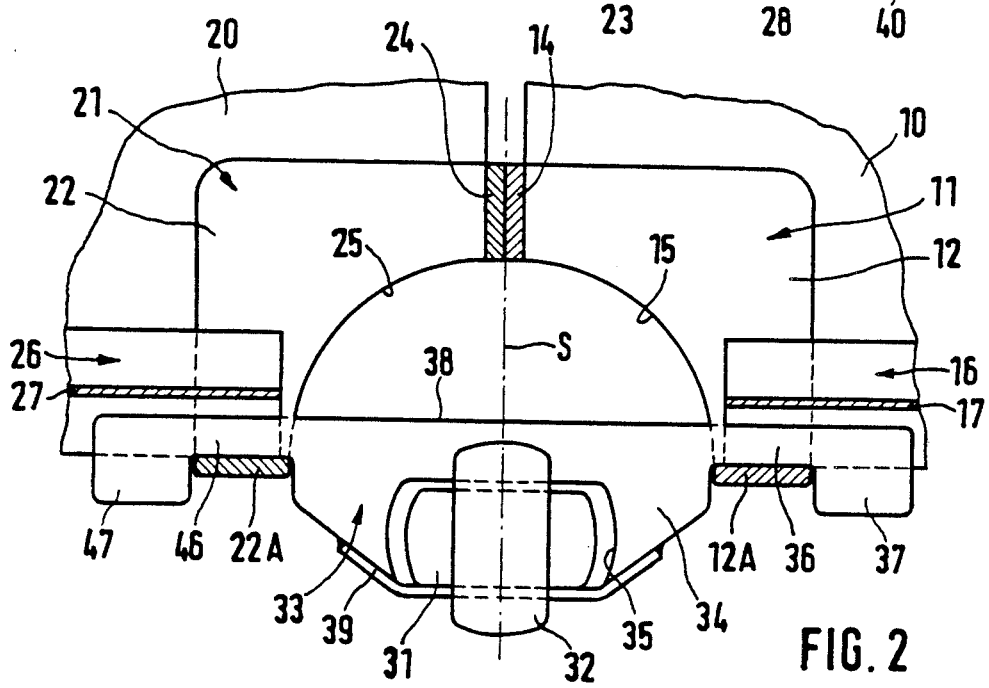

ARRANGEMENT FOR LOCKING LOADING UNITS

An arrangement for locking loading units by means of a latching plate is known from EP-A-189,054 corresponding to U.S. Pat. No. 4,682,923. A problem arising with this arrangement is that the locking point is substantially aligned with the front edge of the loading unit so that the latter is insufficiently secured against tilting about the front edge due to decelerations of the transport vehicle. Additional measures are required to prevent such tilting.

The known arrangement further provides that every single loading unit is arrested on two twistlocks or other locking members by means of a corresponding pair of latching plates. In the case of containers whose length as measured in the direction of travel is less than the distance between successive pairs of locking members, this means that the available loading area cannot be used in an optimum way because there remains some space between every single loading unit and the next loading unit.

The present invention is based on the object of further improving the known arrangement in such a way that, while the overall effort is reduced, any tilting of the locked loading units is impossible and at the same time the respective available loading area can be better utilized.

The solution of the specified object as provided by the invention includes providing an arrangement wherein the latching plate is symmetrically designed and is movable between a storage position at one loading unit to a latching position extending across adjacent corner openings of two loading units. The symmetrically designed latching plate permits joint coupling of two loading units disposed in back-to-back relationship to a common locking member. Apart from the fact that the total of required latching plates is reduced and handling during locking is facilitated thereby, the locking point is shifted towards the centre of the overall arrangement due to the joint coupling of two loading units, whereby the overall arrangement is protected from tilting about either transverse edge.

Furthermore, two respective loading units are disposed directly back-to-back so that, other conditions being similar, double-sized spaces remain between successive pairs of loading units which spaces can be better utilized for accommodating other cargo.

The further development of preferred embodiments of the invention involves a latching plate which can be stowed in an I-section framework member of one of the loading units. This is advantageous in respect of handling, because the latching plate can be completely pushed into the framework member of a container. In a particularly simple design of the corner region, the web portion necessary for hooking the loading unit to the latching plate is constituted by the corner fitting itself. The design of preferred embodiments of the latching plate is advantageous when twistlocks are used as locking members, because the upper surface of the latching plate extends in parallel to the loading area; at the same time the latching plate is suitably strengthened in the outer region of the recess encompassing the locking member. A further improvement of the invention offers the advantage that the latching plate can be inserted after the two loading units have been pushed together and can be secured, to the locking member by pivoting, whereby mutual coupling of the two loading units is brought about at the same time.

Embodiments of the present invention will be described in detail below with reference to the accompanying drawing, in which FIG. 1 is a perspective view of the contiguous corner portions of two mutually aligned back-to-back containers on a loading area provided with a twist lock, FIG. 2 is a horizontal sectional view through FIG. 1 showing the latching plate in the outwardly pivoted position, and FIG. 3 is a vertical sectional view along the line III—III in FIG. 1, with the twistlock being omitted.

The contiguous corner portions of two containers 10, 20 illustrated in FIG. 1 are respectively provided with a corner fitting 11 and 21 of the type known from EP-A-97,269 corresponding to U.S. Pat. No. 4,505,402 and similarly also from EP-A-189,054 U.S. Pat. No. 4,628,923 mentioned above. Each corner fitting 11, 21 includes three mutually orthogonal walls, FIG. 1 respectively illustrating the vertical front walls 12, 22 and the lower horizontal walls 13, 23. The likewise vertical third walls 14, 24 of the two corner fittings 11, 21 are apparent in the sectional view o FIG. 2. The two containers are disposed back-to-back in such a way that the walls 14, 24 of the corner fittings abut one another while the walls 12, 22 are coplanar.

Each of the three walls 12, 13, 14 and 22, 23, 24 of the corner fittings 11 and 21, respectively, is provided with a quarter-circle cutout the centre of which is located at the (imaginary) tip of the corner fitting. Together, these three cutouts define a corner opening 15, 25. The cutouts defining the corner opening 15, 25 need not be of quarter-circle shape but can have other shapes such as rectangular or square shape.

As shown in the drawing, the bottom framework members 16, 26 extending in longitudinal direction of the container are I-section members each having an upright central web 17, 27, a lower transverse flange 18, 28 and an upper transverse flange 19, 29. The further bottom framework members extending transversely to said framework members 16, 26, and the corner supports of the two containers are not illustrated in the drawing.

Each of the longitudinally extending bottom framework members 16, 26 is inserted in part into the respective corner fitting 11 and 21 so as to end behind the respective corner opening 15, 25, and is welded to the inner surfaces of the vertical wall 12, 22 and the lower horizontal wall 13, 23.

FIG. 1 also illustrates a twistlock 30 which is disposed on the loading surface on which the two containers 10, 20 are placed. Normally, the twistlock 30 includes a base 31 fixed to the loading surface and a head 32 adapted to be rotated about a vertical central axis.

As shown in FIGS. 1 and 2, the containers 10, 20 are disposed on the loading surface in such a way that the plane S, which is perpendicular to the longitudinal direction of the framework members 16, 26 and in which the walls 14, 24 of the two corner fittings 11, 21 abut each other, passes through the centre of the twistlock 30, and the plane in which the two walls 12, 22 of the corner fittings 11, 21 are mutually aligned is disposed somewhat behind the twistlock 30.

The drawing also shows a latching plate 33 which includes a central latching portion 34 having an elongated recess 35 and arms 36, 46 extending from either side and each having an outer hook portion 37, 47. The central latching portion 34, the two arms 36, 46 and the outer hook portions 37, 47 constitute a continuous rectilinear rear edge 38 which extends longitudinally of the framework members 16, 26 when the latching plate 33 is in one of its positions shown in the drawing.

The latching plate 33 is of symmetrical design in respect of its centre plane, said centre plane coinciding with the above-mentioned plane S in the latching position illustrated in FIG. 2.

In the latching position of FIG. 2, in which the main surface of the latching plate 33 is horizontal, the central latching portion 34 projects laterally from the common opening defined by the corner openings 15, 25 of the two corner fittings 11, 21. The recess 25 overlaps the base 31 of the twistlock 30 whose head 32 has been rotated to a position which is perpendicular to the base 31, whereby the latching plate 33 is locked relative to the loading surface.

The illustrated twistlock 30 is of the type used for corner fittings as specified in ISO 1161 on container vehicles and container ships. Accordingly, the shape of the recess 35 is matched with such corner fittings as specified in ISO 1161.

In the latching position illustrated in FIG. 2 the two arms 36, 46 of the latching plate 33 rest on the bottom transverse flanges 18, 28 of the framework members 16, 26 and the hook portions 37, 47 engage behind the bottom web portions 12A, 22A of the vertical walls 12, 22 of the corner fittings 11, 21. Thereby the two containers are hooked to the latching plate 33 and coupled to each other.

As will be apparent from FIG. 2, the latching plate 33 is designed in accordance with the corner fittings 11, 21 such that there is only little clearance for any movement of the containers 10, 20 in longitudinal direction. Although the arms 36, 46 are shown to be narrower than the space left between the web portions 12A, 22A of the corner fittings 11, 21 and the vertical central webs 17, 27 of the framework members 16, 26, any movement of the containers 10, 20 in transverse direction is prevented by the fact that similar locking is provided at the corresponding location on the opposite side of the containers 10, 20.

FIG. 3 shows the latching plate 33 in dashed lines in the latching position of FIG. 2 (but without twistlock) and in full lines in a vertical position which is pivoted relative thereto by 90°. In order to permit such pivoting the outer contour of the central latching portion 34 of the latching plate 33 is designed such that it fits through the semicircular (in FIG. 2) section defined by the two corner openings 15, 25 of the corner fittings 11, 21.

In the released vertical position, which is illustrated in full lines in FIG. 3, the latching plate 33 can be displaced in longitudinal direction of the framework members 16, 26, for instance to the position shown in FIG. 1, in which it may be removed from the framework member 16. To this end the space, which is defined by the two transverse flanges 18, 19 and the upright central web 17 of the framework member 16 and is disposed to the right of the web portion 12A, is exposed to the outside at least along the length of the latching plate 33.

In a modification it may also be suitable to expose this space to the outside only over a short length so that the latching plate 33 can merely be gripped for being displaced while measures are provided for captively retaining the latching plate 33 in its released condition within the framework member 16.

It will also be apparent from the drawing that the recess 35 provided in the latching portion 34 of the latching plate 33 is defined on the outside thereof by a strip of material 39 welded to the latching plate 33. In the horizontal latching position, which is illustrated in dashed lines in FIG. 3, the strip of material 39 defines a downwardly directed projection whose height is equal to the sum of the thickness of the material of the bottom transverse flange 18 of the framework member 16 and the thickness of the bottom wall 13 of the corner fitting 11. Therefore the upper surface of the latching plate 33 is horizontal in the latching position when the lower surface of the strip of material 39 rests on the loading surface 40 indicated in FIG. 3.

In order to provide for free movement of the latching plate 33 in the released position within the framework member 16 (or 26) the maximum width of the plate, which as shown in FIG. 2 is in the vicinity of the latching portion 34, must be less than the clear height of the central web 17, and the clear spacing between the web portion 12A and the central web 17 must be larger than the maximum thickness of the latching plate 33, i.e. larger than the width of the strip of material 39 which constitutes the enlargement.

In the above-described embodiment the invention has been explained with reference to the mutual coupling and locking of containers. The same measures may also be provided for transport platforms or other kinds of loading units.

I claim:

1. An arrangement for locking loading units, the bottom framework members of which are coupled by means of corner fittings each provided with a corner opening, to a locking member by means of a latching plate which is movable longitudinally with respect to a framework member and includes a latching portion adapted to be passed through the corner opening of a corner fitting and having a recess for engagement with the locking member, said latching plate including a hook portion which in the latching position engages behind a web portion of the loading unit, characterized in that in the latching position a plane (S) of the latching plate which passes through the center of the recess and is perpendicular to the direction of movement of the latching plate, is in alignment with an outer transverse face of the corner fitting, and in that the latching plate is substantially symmetrical relative to said plane (S).

2. The arrangement as claimed in claim 1, characterized in that the framework members have I-section design with an upright central web and the maximum width of the latching plate is less than the clear height of the central web.

3. An arrangement as claimed in claim 2, characterized in that the web portion is a part of the corner fitting overlapping outer flange edges of the I-section framework member.

4. The arrangement as claimed in claim 2, characterized in that the latching portion of the latching plate is provided on the edge thereof which is the outer one in the latching position with a downwardly directed projection having a height equal to the sum of the thickness of a bottom I-section flange and a bottom wall of the corner fitting, and that a clear spacing between the web portion and an I-section central web is larger than the total thickness of the latching plate in the vicinity of the projection.

5. The arrangement as claimed in claim 4, characterized in that the projection is constituted by a strip of material welded to the latching portion.

6. The arrangement as claimed in claim 5, characterized in that the strip of material defines a recess relative to the outside.

7. The arrangement as claimed in claim 2, characterized in that the space defined by the central web and flanges of the I-section framework member on the outer side of the loading unit adjacent the web portion is exposed along a length which corresponds at least to the length of the latching plate.

8. The arrangement as claimed in claim 1, characterized in that the corner opening and the latching portion of the latching plate are designed such that the latching plate can be pivoted between its latching position and a position which is substantially perpendicular thereto.

9. The arrangement as claimed in claim 3, characterized in that the latching portion of the latching plate is provided on the edge thereof which is the outer one in the latching position with a downwardly directed projection having a height equal to the sum of the thickness of a bottom I-section flange and a bottom wall of the corner fitting, and that a clear spacing between the web portion and the I-section central web is larger than the total thickness of the latching plate in the vicinity of the projection.

10. The arrangement as claimed in claim 9, characterized in that the projection is constituted by a strip of material welded to the latching portion.

11. The arrangement as claimed in claim 10, characterized in that the strip of material defines a recess relative to the outside.

12. The arrangement as claimed in claim 9, characterized in that the space defined by the central web and flanges of the I-section framework member on the outer side of the loading unit adjacent the web portion is exposed along a length which corresponds at least to the length of the latching plate.

13. The arrangement as claimed in claim 9, characterized in that the corner opening and the latching portion of the latching plate are designed such that the latching plate can be pivoted between its latching position and a position which is substantially perpendicular thereto.

14. The arrangement as claimed in claim 7, characterized in that the corner opening and the latching portion of the latching plate are designed such that the latching plate can be pivoted between its latching position and a position which is substantially perpendicular thereto.

15. An arrangement for locking a plurality of loading units of the type having corner fittings defining respective corner openings disposed adjacent one another, comprising a locking member which is connectable to a transport vehicle or the like, and a latching member,
   wherein said latching member is movable with respect to first and second ones of said loading units between a non-latching position at one of said loading units to a latching position extending through the respective corner fittings of said first and second ones of said loading units, said latching member being detachably engageable with the locking member at the adjacent corner opening when in said latching position with said latching member clampingly engaging the first and second loading units by respective latching member hook portions, and wherein said hook portions are substantially symmetrically disposed with respect to a center plane of the latching member, said hook portions being configured to clampingly engage the respective first and second loading units when the latching member is in said latching position.

16. An arrangement according to claim 15, wherein the loading units include framework members having an I-section design which face the respective corner openings, and wherein the latching member is configured to fit within the cross-sectional confines of one of the I-section design framework members when in said non-latching position.

17. An arrangement according to claim 16, wherein the hook portions of the latching member are movable to a position outwardly of the cross-sectional confines of the I-section when the latching member is in said latching position.

* * * * *